(12) United States Patent
Teitgen et al.

(10) Patent No.: US 6,564,879 B2
(45) Date of Patent: May 20, 2003

(54) LOCKING DEVICE FOR A GUARD OF SOIL-WORKING MACHINE

(75) Inventors: Hervé Teitgen, Breistroff la Grande (FR); Edmond Oberle, Haegen (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/883,252

(22) Filed: Jun. 19, 2001

(65) Prior Publication Data

US 2002/0043381 A1 Apr. 18, 2002

(30) Foreign Application Priority Data

Jul. 7, 2000 (FR) .............................. 00 09171

(51) Int. Cl.⁷ .............................................. A01B 33/00
(52) U.S. Cl. ...................................... 172/112; 172/509
(58) Field of Search .............................. 172/112, 113, 172/42, 45, 48, 47, 509, 508; 37/223

(56) References Cited

U.S. PATENT DOCUMENTS

| | | | | |
|---|---|---|---|---|
| 2,754,744 A | * | 7/1956 | Hall | |
| 3,041,750 A | * | 7/1962 | Garnand | |
| 3,795,279 A | * | 3/1974 | Nelson | |
| 3,901,325 A | * | 8/1975 | Richards | |
| 4,386,661 A | * | 6/1983 | McCanse et al. | |
| 4,664,201 A | | 5/1987 | Pegoraro | |
| 4,669,549 A | * | 6/1987 | Sanpei et al. | |
| 4,775,014 A | * | 10/1988 | Ranner | |
| 5,373,902 A | * | 12/1994 | Lindblom | |
| 6,082,276 A | | 7/2000 | Klein et al. | |

FOREIGN PATENT DOCUMENTS

| | | | | |
|---|---|---|---|---|
| DE | 1014774 | * | 8/1957 | ................. 172/112 |
| DE | 1557754 | * | 1/1970 | ................. 172/112 |
| DE | 2716237 | * | 10/1978 | ................. 172/112 |
| DE | 2818194 | * | 11/1979 | ................. 172/112 |
| DE | 29 50 044 | | 7/1981 | |
| FR | 2 420 293 | | 10/1979 | |
| FR | 2 430 172 | | 2/1980 | |
| GB | 786990 | | 11/1957 | |
| GB | 2019702 | * | 11/1979 | ................. 172/112 |

* cited by examiner

Primary Examiner—Victor Batson
(74) Attorney, Agent, or Firm—Oblon, Spivak, McClelland, Maier & Neustadt, P.C.

(57) ABSTRACT

A soil-working machine comprising a chassis, a rotor connected to the chassis, driven in rotation during work about a substantially horizontal axis directed transversely to a direction of forward travel of the machine, at least one guard connected to the chassis with an articulation of pivot type, the axis of which is substantially parallel to the axis of rotation of the rotor, and at least one adjustable retaining device which limits, downward only, the angular travel of the guard about the articulation. The soil-working machine additionally includes at least one locking device which limits, upward, during transport, the angular travel of the guard so as to keep the latter in the position defined by the setting of the retaining device.

12 Claims, 5 Drawing Sheets

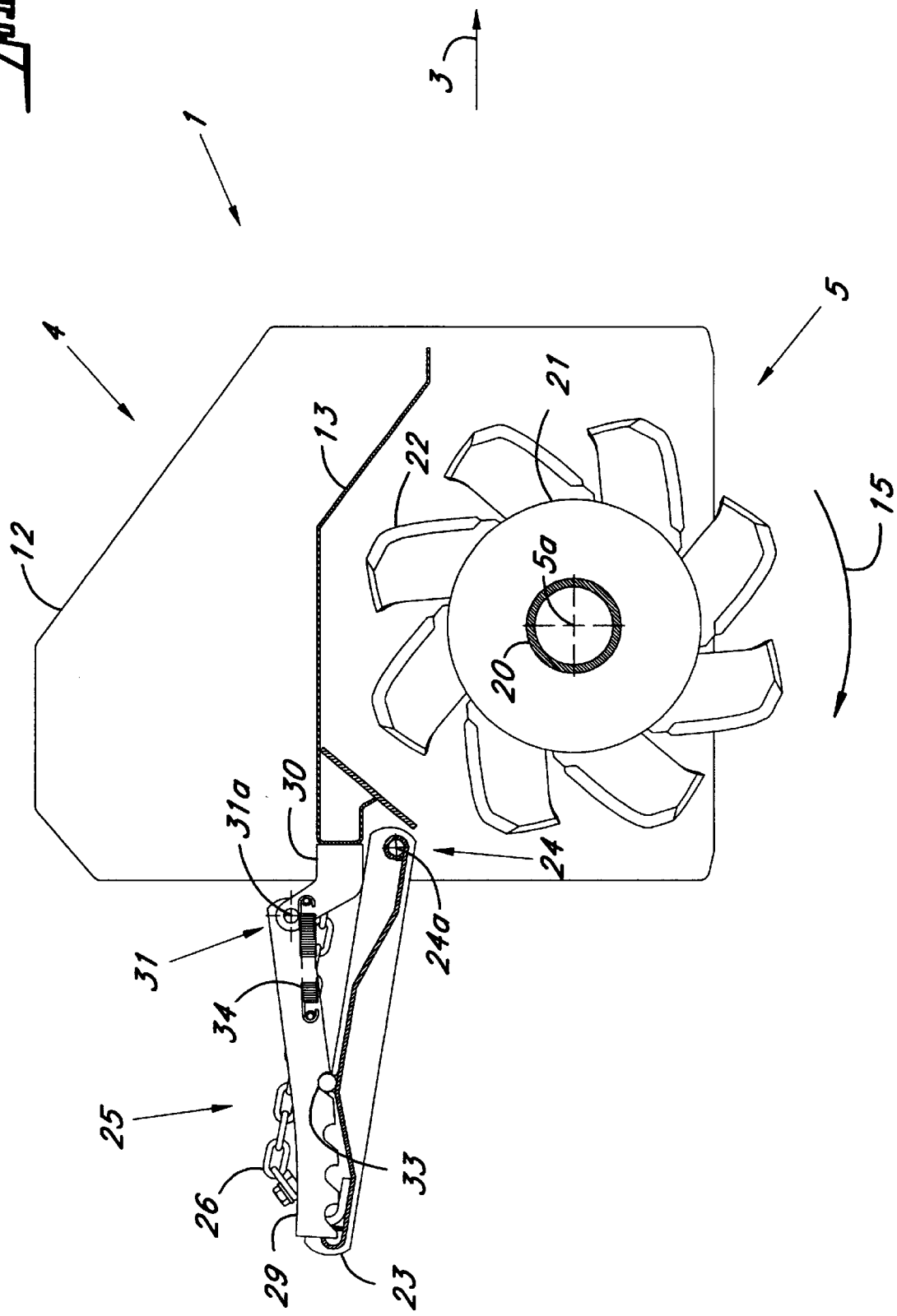

LOCKING DEVICE FOR A GUARD OF SOIL-WORKING MACHINE

BACKGROUND OF THE INVENTION

1. Field of the Invention

The present invention relates to a soil-working machine comprising:

- a chassis,
- a rotor connected to said chassis, driven in rotation during work about a substantially horizontal axis directed transversely to a direction of forward travel of said machine,
- at least one guard connected to said chassis by means of an articulation of pivot type, the axis of which is substantially parallel to the axis of rotation of said rotor, and
- at least one adjustable retaining device which limits, downward only, the angular travel of said guard about said articulation.

2. Discussion of the Background

A soil-working machine such as this, produced in the form of a rotary cultivator, is known from document FR 2 420 293. This known machine comprises a guard connected, at one of its ends, to the chassis by means of hinges. By altering the angular position of the guard with respect to the chassis, the user can set the crumbling of the strip of soil worked by the rotor. To do this, this known machine also comprises a retaining device consisting of a chain. Said chain is connected, on one hand, to the chassis and, on another hand, to the guard. The angular position of the guard is dependent upon the length of said chain.

During transport, the rotary cultivator experiences accelerations, particularly vertical ones. With this type of machine, these accelerations often give rise to flapping of said guard. This flapping in turn gives rise to violent and repeated impacts on the chain and the hinges. This known machine admittedly has a damping device inserted between said chain and said guard, but this damping device is capable only of attenuating the impacts, and its cost of manufacture is relatively high.

SUMMARY OF THE INVENTION

The object of the present invention consists in overcoming this drawback of the state of the art by producing an inexpensive device that eliminates said flapping of the guard during transport.

To this end, the soil-working machine of the present invention is one which additionally comprises at least one locking device which limits, upward, during transport, the angular travel of said guard so as to keep the latter in the position defined by the setting of said retaining device. The flapping of said guard is thus eliminated. Said chain and said articulation therefore no longer experience impacts during transport.

BRIEF DESCRIPTION OF THE DRAWINGS

Other features of the invention will become apparent in the subclaims and in the following description of nonlimiting embodiments of the invention which are depicted in the appended drawings, in which:

FIG. 5 depicts, in the view of FIG. 4, the soil-working machine in the transport position.

DESCRIPTION OF THE PREFERRED EMBODIMENTS

Figure 1:
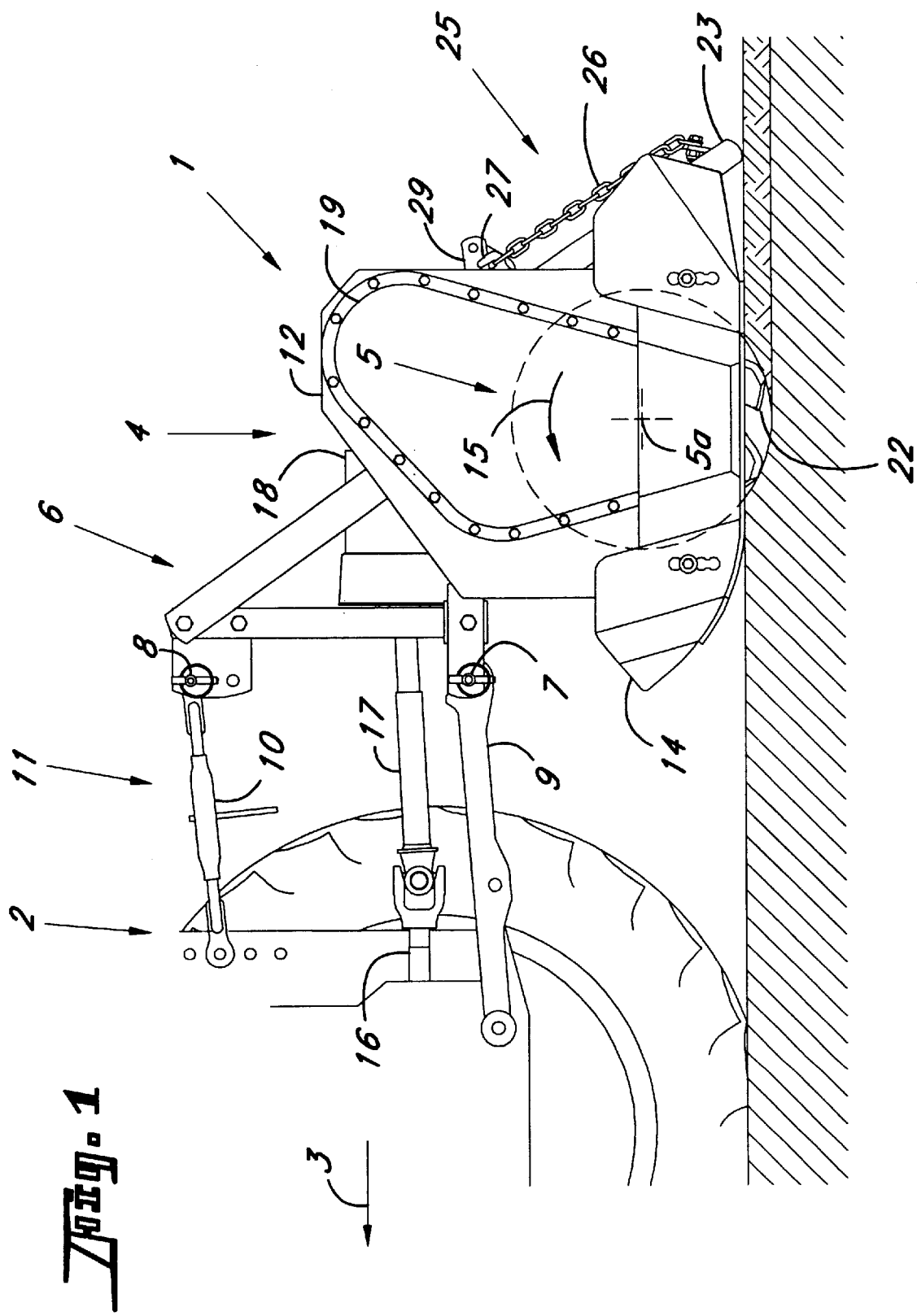
FIG. 1 depicts a side view of a soil-working machine according to the invention, in the work position.

FIGS. 1 to 5 show a soil-working machine according to the present invention, produced in the form of a rotary cultivator 1. This is coupled, in FIG. 1, to a tractor vehicle 2 partially depicted. During work, said rotary cultivator 1 is trailed by said tractor vehicle 2 in a direction of forward travel 3 and prepares a strip of land with a view, for example, to sowing. For this purpose, said rotary cultivator 1 is made up, amongst other things, of a chassis 4 and of a rotor 5 intended to work said soil.

Figure 2:
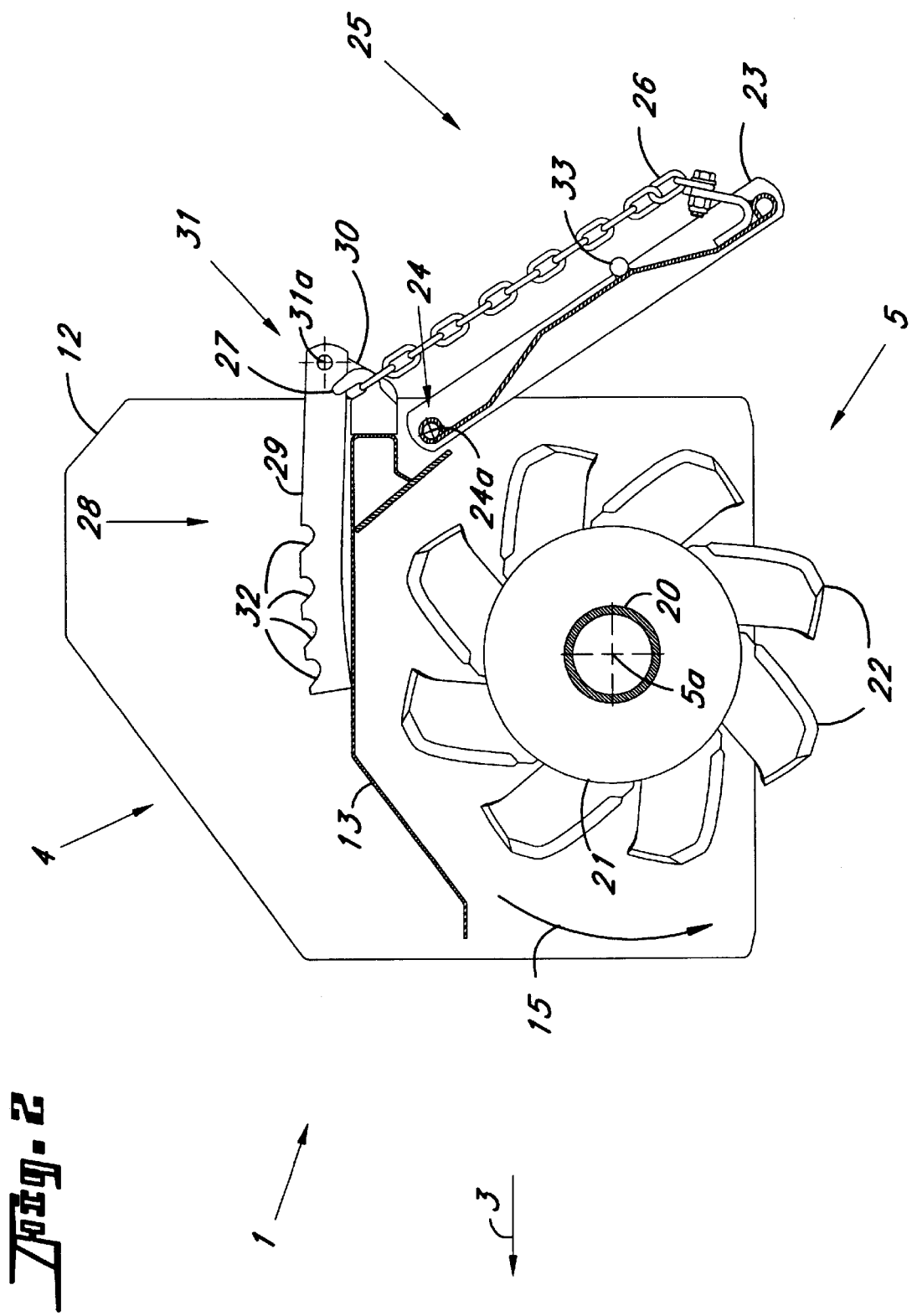
FIG. 2 depicts, in longitudinal section, the machine of FIG. 1.

Said chassis 4 in particular comprises a frame 6 with two lower hitching points 7 and a top hitching point 8. Said hitching points 7,8 are designed, in a way known to those skilled in the art, for coupling said rotary cultivator 1 to the lower arms 9 and to the top arm 10 of the 3-point hitch 11 of said tractor vehicle 2. Said chassis 4 also comprises two side walls 12 joined together at least by an upper guard 13 (FIG. 2).

During work, said chassis 4 rests at least partially on the ground by means of two skids 14. Each skid 14 is positioned at the lower end of a respective side wall 12 of said chassis 4. In this embodiment, the position of said skids 14 with respect to said chassis 4 can be altered in a substantially vertical direction. The user can thus advantageously set the working depth of said rotary cultivator 1.

Said rotor 5 is connected, at each of its ends, to said side walls 12 by means of a respective articulation in such a way that the longitudinal axis 5a of the rotor 5 is substantially horizontal and substantially perpendicular to said direction of forward travel 3. During work, said rotor 5 is driven in rotation about its longitudinal axis 5a in a counterclockwise direction 15 when studying FIG. 1. For this purpose, said rotary cultivator 1 also comprises transmission elements which, in a way known to those skilled in the art, connect said rotor 5 to a power take-off 16 of the tractor vehicle 2. These transmission elements are made up in particular of a transmission shaft 17 with universal joints which transmits movement from the power take-off 16 to a central gearbox 18. Said central gearbox 18 in turn drives the rotor 5 via a side gearbox 19.

FIGS. 2 to 5 depict, in longitudinal section, the two side views of said rotary cultivator 1. For simplification purposes, various elements present in FIG. 1 are no longer depicted in FIGS. 2 to 5. These elements are, in particular, the frame 6, the transmission elements and the skids 14.

As can be seen in FIGS. 2 to 5, said rotor 5 consists of a tube 20 on which several supports 21 are fixed. Said rotor 5 also has several tools 22 connected respectively to a corresponding support 21. During work, said tools 22, by striking the soil, work the land while crumbling any residue there might be. The fact that the worked soil is thrown against a guard 23 increases the crumbling of said soil.

Given the direction of forward travel 3, said guard 23 is arranged behind said rotor 5 and extends substantially over the entire width thereof. Said guard 23 is advantageously connected, at one of its ends, to said chassis 4 by means of an articulation 24 of the pivot type, the axis 24a of which is substantially parallel to the axis of rotation 5a of said rotor 5. Thus, said guard 23 can be pivoted with respect to said chassis 4, which allows the user to set the crumbling of the worked soil. What happens is that when the guard 23 is closed, that is to say in the substantially vertical position (FIGS. 1, 2 and 3), the soil is worked more vigorously and hence crumbled more. By contrast, when the guard 23 is open, that is to say in a substantially horizontal position (FIGS. 4 and 5), the crumbling is less extensive.

In the embodiment depicted in the Figures, said guard 23 has a natural tendency, through the action of its weight, to remain in a substantially vertical position. To allow for less crumbling, said rotary cultivator 1 additionally comprises a retaining device 25 which allows said guard 23 to be held away from this substantially vertical position. Said retaining device 25 is advantageously adjustable. Thus, the position of said guard 23, and therefore the crumbling, can be adapted perfectly to all working conditions. In addition, said retaining device 25 advantageously allows said guard 23 to pivot freely beyond the set position. What this means is that said retaining device 25 limits in a downward direction only the angular travel of said guard 23 with respect to said articulation 24. Thus, said rotary cultivator 1 is perfectly capable of following the unevenness of the ground or of discharging a foreign body, for example a stone, with no risk of deforming said guard 23.

In the embodiment depicted in the figures, said retaining device 25 consists of a chain 26 connected, on one hand, to said chassis 4 and, on another hand, to said guard 23. It can be seen more specifically in FIGS. 2 and 3 that said chain 26 is connected to said chassis 4 by means of a hook 27, itself fixed to said upper guard 13. In a way known to those skilled in the art and as visible in FIGS. 2 and 4, the angular position of said guard 23 depends on the location, within said chain 26, of the arm held in said hook 27. Said chain 26 is advantageously arranged in a vertical plane containing the center of mass of said guard 23.

According to one feature of the present invention, said rotary cultivator 1 also comprises a locking device 28. Said locking device 28 has to prevent accelerations, experienced by said rotary cultivator 1 during transport, from causing said guard 23 to flap and from therefore causing impacts with said retaining device 25 and said articulation 24.

In the embodiment depicted in the figures, said locking device 28 consists of a rack 29. At one of its ends said rack 29 is connected to a support 30, itself fixed to said upper guard 13, by means of an articulation 31 of the pivot type, the axis 31a of which is substantially parallel to the axis 24a of said articulation 24 connecting said guard 23 to said chassis 4. At the other end, said rack 29 has several notches 32.

During work, (FIGS. 1, 2 and 4), said rack 29 is held away from said guard 23. In this embodiment, said rack 29 thus advantageously extends above said upper guard 13. Said guard 23 occupies, under the action of its own weight, the position defined by the retaining device 25 and can, if necessary, pivot freely upward.

During transport (FIGS. 3 and 5), the user pivots said rack 29 about said articulation 31. Thus, one of said notches 32 comes to rest against a stop 33 fixed to said guard 23. Said rack 29 prevents said guard 23 from pivoting upward. This guard is therefore kept in the position defined by the setting of said retaining device 25. As a result, said guard 12 is prevented from flapping.

Figure 3:
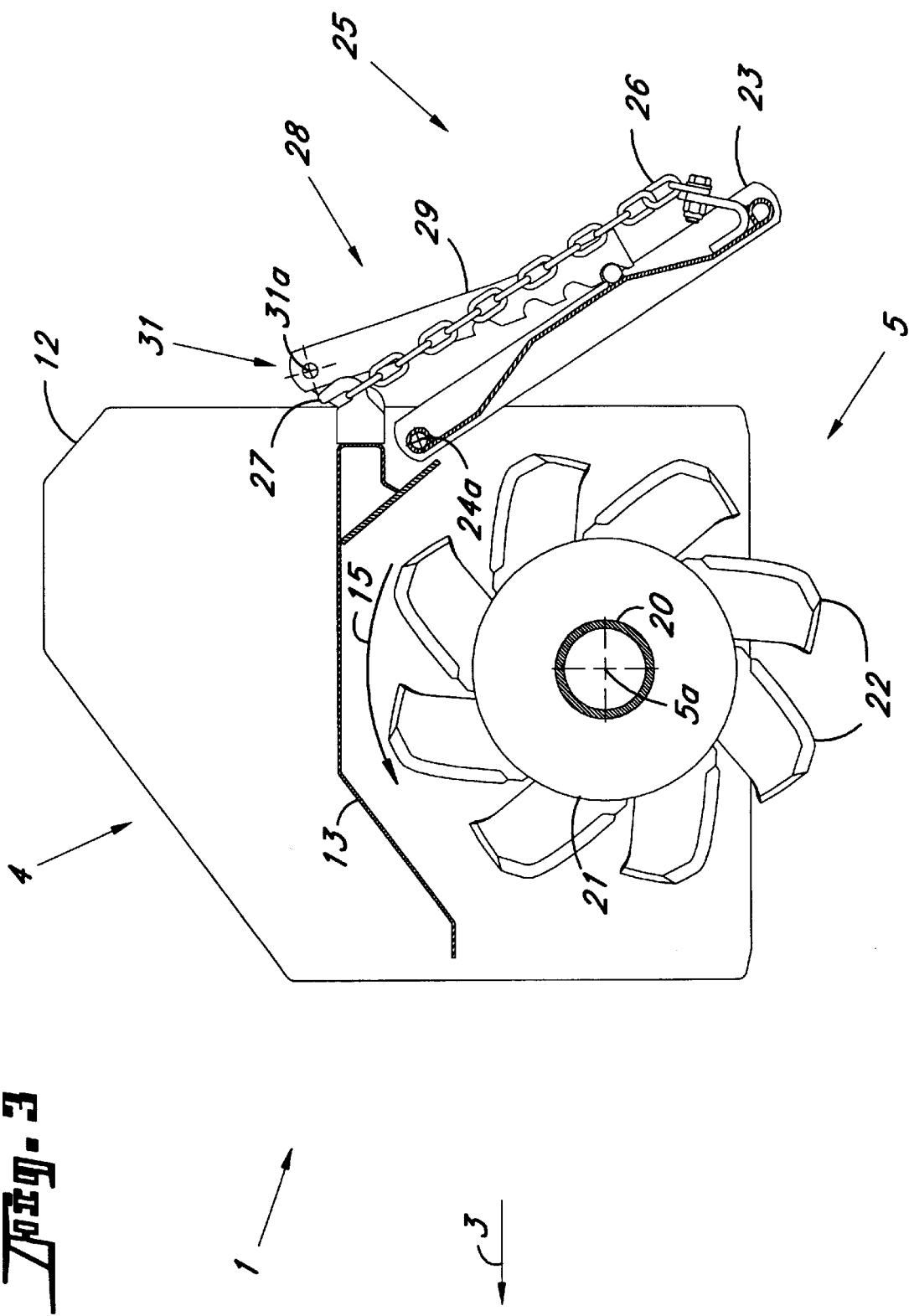
FIG. 3 depicts, in the view of FIG. 2, the soil-working machine in the transport position.
Figure 4:
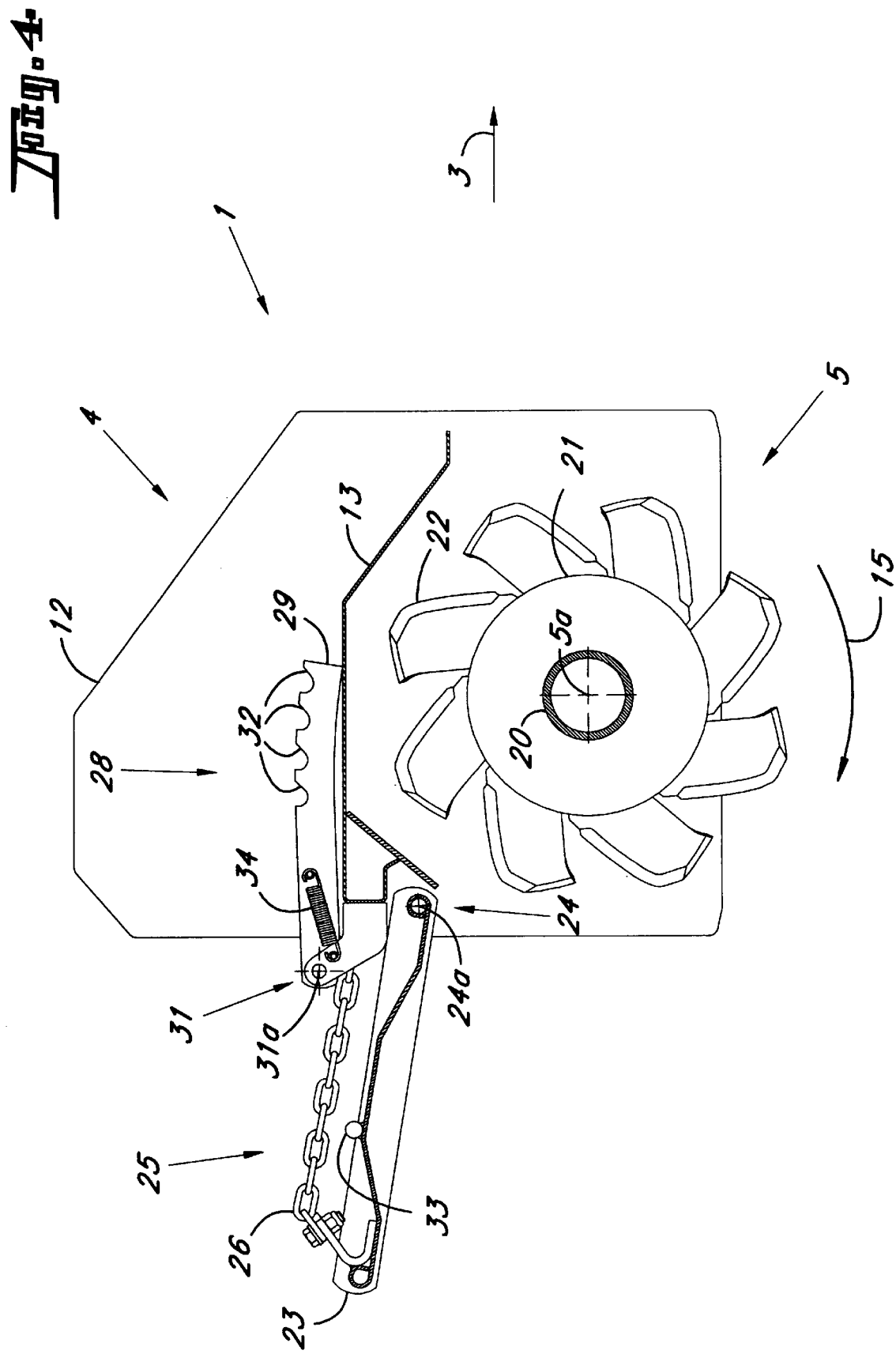
FIG. 4 depicts, in section, the other side view of the soil-working machine, in the work position and with a different guard setting.

The location of each notch 32 on said rack 29 advantageously corresponds to one possible setting of said guard 23 (FIGS. 3 and 5). Thus, to lock said guard 23 during transport, the user has no need to act upon said retaining device 25.

Said locking device 28 advantageously also comprises a draw-spring 34 connected, on one hand, to said rack 29 and, on another hand, to said support 30. Said spring 34 allows said rack 29 to maintain its work position or its transport position.

The rotary cultivator 1 which has just been described is one exemplary embodiment which cannot in any way restrict the field of protection defined by the claims which follow.

Thus, said rotary cultivator 1 may very well comprise a retaining device 25 and/or a locking device 28 at each lateral end of said guard 23.

It is also possible to conceive of a rotary cultivator 1 comprising two guards 23, each one covering a respective half-width of said rotor 5.

What is claimed as new and desired to be secured by letters patent of the United States is:

1. Soil-working machine comprising:

a chassis, a rotor connected to said chassis, driven in rotation during work about a horizontal axis directed transversely to a direction of forward travel of said machine, at least one guard connected to said chassis by means of an articulation of pivot type, an axis of said articulation is parallel to the axis of rotation of said rotor, at least one adjustable retaining device which limits, downward only, an angular travel of said guard about said articulation, and which additionally includes at least one locking device which limits, upward, during transport, the angular travel of said guard so as to keep the guard in a position defined by a setting of said retaining device, wherein said retaining device is a chain.

2. Soil-working machine as claimed in claim 1, wherein said locking device can occupy at least one transport position and at least one work position.

3. Soil-working machine as claimed in claim 2, wherein said locking device is kept in the transport position using a spring.

4. Soil-working machine as claimed in claim 2, wherein said locking device is kept in the work position using a spring.

5. Soil-working machine as claimed in claim 2, wherein said locking device is kept in the transport position and in the work position using a spring.

6. Soil-working machine as claimed in claim 1, wherein said locking device is connected to said chassis.

7. Soil-working machine as claimed in claim 1, wherein said locking device during transport bears against a stop fixed to said guard.

8. Soil-working machine as claimed in claim 1, wherein said locking device includes a rack which has several notches.

9. Soil-working machine as claimed in claim 8, wherein a position of each notch on said rack corresponds to one possible setting of said guard.

10. Soil-working machine as claimed in claim 1, wherein said retaining device is flexible.

11. Soil-working machine as claimed in claim 1, wherein said retaining device is of variable length.

12. Soil-working machine as claimed in claim 1, wherein said retaining device is connected, on one hand, to said guard and, on another hand, to said chassis.

* * * * *